US009063617B2

(12) United States Patent
Eliasson et al.

(10) Patent No.: US 9,063,617 B2
(45) Date of Patent: *Jun. 23, 2015

(54) INTERACTIVE DISPLAY SYSTEM, TOOL FOR USE WITH THE SYSTEM, AND TOOL MANAGEMENT APPARATUS

(75) Inventors: Jonas Ove Philip Eliasson, Valby (DK); Niels Agersnap Larsen, Kongens Lyngby (DK); Jens Bastue, Virum (DK); Jens Wagenblast Stubbe Østergaard, Lejre (DK)

(73) Assignee: FlatFrog Laboratories AB, Lund (SE)

( * ) Notice: Subject to any disclaimer, the term of this patent is extended or adjusted under 35 U.S.C. 154(b) by 2721 days.

This patent is subject to a terminal disclaimer.

(21) Appl. No.: 11/581,126

(22) Filed: Oct. 16, 2006

(65) Prior Publication Data

US 2008/0088603 A1    Apr. 17, 2008

(51) Int. Cl.
*G06F 3/042* (2006.01)
*G06F 3/03* (2006.01)

(52) U.S. Cl.
CPC ............ *G06F 3/0428* (2013.01); *G06F 3/0312* (2013.01); *G06F 2203/04109* (2013.01)

(58) Field of Classification Search
None
See application file for complete search history.

(56) References Cited

U.S. PATENT DOCUMENTS

| 4,180,702 A | 12/1979 | Sick et al. ............... 250/227.11 |
| 4,209,255 A | 6/1980 | Heynau et al. ............... 356/152 |
| 4,346,376 A | 8/1982 | Mallos ........................... 340/712 |
| 4,484,179 A | 11/1984 | Kasday ...................... 340/365 P |
| 4,542,375 A | 9/1985 | Alles et al. .................... 340/712 |
| 5,572,251 A | 11/1996 | Ogawa .......................... 348/207 |
| 5,600,105 A | 2/1997 | Fukuzaki et al. ............... 178/19 |
| 5,672,852 A | 9/1997 | Fukuzaki et al. ............... 178/19 |
| 5,686,942 A | 11/1997 | Ball .............................. 345/158 |
| 5,729,249 A * | 3/1998 | Yasutake ..................... 345/173 |
| 5,945,980 A | 8/1999 | Moissev et al. ............... 345/173 |

(Continued)

FOREIGN PATENT DOCUMENTS

| DE | 10139147 A1 | 3/2003 |
| EP | 1 457 870 | 9/2004 |

(Continued)

OTHER PUBLICATIONS

Iizuka, Keigo, *Elements of Photonics. vol. I: In Free Space and Special Media*, Jun. 15, 2002, John Wiley & Sons, Inc., Chapter 2, pp. 110-165.

*Primary Examiner* — Seokyun Moon
(74) *Attorney, Agent, or Firm* — Pillsbury Winthrop Shaw Pittman LLP

(57) ABSTRACT

An interactive display system that may be implemented to provide an electronic whiteboard that enables users to input information to the system by engaging a display with one or more objects. The system may present an image via the display that reflects the inputs received from the user. For example, the display may be dynamically updated to mimic inputs made to a whiteboard by the user via one or more pens and/or an eraser. The interactive display system may implement an underlayer embedded within the display to guide electromagnetic radiation that emanates from an object engaged with the display to one or more detectors by total internal reflection. Due at least in part to the efficiency of the underlayer in guiding the electromagnetic radiation to the detectors, the interactive display system may enhance the speed and/or accuracy of the interpretation of the inputs made by the user.

19 Claims, 8 Drawing Sheets

(56) References Cited

U.S. PATENT DOCUMENTS

| | | | |
|---|---|---|---|
| 5,959,617 A | 9/1999 | Bird et al. | 345/182 |
| 6,061,177 A | 5/2000 | Fujimoto | 359/443 |
| 6,227,667 B1 | 5/2001 | Halldorsson et al. | 351/206 |
| 6,380,732 B1 | 4/2002 | Gilboa | 324/207.17 |
| 6,390,370 B1 | 5/2002 | Plesko | 235/462.49 |
| 6,660,964 B1 | 12/2003 | Benderly | 219/121.74 |
| 6,799,141 B1 | 9/2004 | Stoustrup et al. | 702/159 |
| 7,133,031 B2 * | 11/2006 | Wang et al. | 345/175 |
| 7,442,914 B2 | 10/2008 | Eliasson et al. | 250/221 |
| 7,465,914 B2 | 12/2008 | Eliasson et al. | 250/221 |
| 7,847,789 B2 | 12/2010 | Kolmykov-Zotov et al. | 345/173 |
| 8,094,136 B2 | 1/2012 | Eliasson et al. | 345/175 |
| 2002/0158823 A1 * | 10/2002 | Zavracky et al. | 345/87 |
| 2002/0158853 A1 | 10/2002 | Sugawara et al. | 345/176 |
| 2003/0137494 A1 | 7/2003 | Tulbert | 345/173 |
| 2003/0156100 A1 * | 8/2003 | Gettemy | 345/204 |
| 2003/0214486 A1 | 11/2003 | Roberts | 345/173 |
| 2004/0027339 A1 | 2/2004 | Schulz | 345/173 |
| 2004/0032401 A1 | 2/2004 | Nakazawa et al. | 345/173 |
| 2004/0238627 A1 | 12/2004 | Silverbrook et al. | 235/382 |
| 2004/0239702 A1 | 12/2004 | Kang et al. | 345/863 |
| 2004/0252091 A1 * | 12/2004 | Ma et al. | 345/87 |
| 2004/0252867 A1 | 12/2004 | Lan et al. | 382/124 |
| 2005/0156914 A1 | 7/2005 | Lipman et al. | 345/179 |
| 2005/0212774 A1 | 9/2005 | Ho et al. | 345/173 |
| 2005/0248540 A1 | 11/2005 | Newton | 345/173 |
| 2005/0253834 A1 | 11/2005 | Sakamaki et al. | 345/207 |
| 2006/0001653 A1 | 1/2006 | Smits | 345/176 |
| 2006/0017706 A1 | 1/2006 | Cutherell et al. | 345/173 |
| 2006/0033725 A1 | 2/2006 | Marggraff et al. | 345/179 |
| 2006/0256092 A1 | 11/2006 | Lee | 345/173 |
| 2006/0279558 A1 | 12/2006 | Van Delden et al. | 345/176 |
| 2006/0281543 A1 | 12/2006 | Sutton et al. | 463/29 |
| 2006/0290684 A1 | 12/2006 | Giraldo et al. | 345/175 |
| 2007/0052684 A1 | 3/2007 | Gruhlke et al. | 345/173 |
| 2007/0125937 A1 | 6/2007 | Eliasson et al. | 250/221 |
| 2007/0152985 A1 | 7/2007 | Ostergaard et al. | 345/176 |
| 2009/0135162 A1 | 5/2009 | Van De Wijdeven et al. | 345/175 |

FOREIGN PATENT DOCUMENTS

| | | |
|---|---|---|
| GB | 2 409 515 | 6/2005 |
| WO | WO 84/03186 | 8/1984 |
| WO | WO 2004/081502 | 9/2004 |
| WO | WO 2004/081956 | 9/2004 |
| WO | WO 2005/026938 | 3/2005 |
| WO | WO 2005/029172 | 3/2005 |
| WO | WO 2005/029395 | 3/2005 |
| WO | WO 2005/125011 | 12/2005 |
| WO | WO 2006/124551 | 11/2006 |

* cited by examiner

INTERACTIVE DISPLAY SYSTEM, TOOL
FOR USE WITH THE SYSTEM, AND TOOL
MANAGEMENT APPARATUS

FIELD OF THE INVENTION

The invention relates to interactive display systems that enable users to input information to the system by using one or more objects (e.g., active objects, passive objects, etc.) to engage a display associated with the system, tools configured to emanate electromagnetic radiation into a display associated with an interactive display system, and a tool management apparatus that controls various aspects of operation of one or more tools configured to emanate electromagnetic radiation into a display associated with an interactive display system.

BACKGROUND OF THE INVENTION

Electronic whiteboards that enable a user to interact with a projected image by engaging a screen displaying the image with an object are known. Conventional systems suffer from various drawbacks. For example, in general these systems are not capable of simultaneously accepting inputs from a plurality of objects. Or, if a plurality of objects are being used to provide inputs to the system, a conventional system may not be capable of identifying the different objects being used. Systems typically do not enable a user to interact with the project image via an object that emits electromagnetic radiation (e.g., a light pen) and an object that is passive optically (e.g., reflects and/or scatters radiation, but does not emit). Additionally, current interactive display systems may be costly, temperamental, bulky, slow, or otherwise in efficient. Other drawbacks also exist.

SUMMARY

One aspect of the invention relates to an interactive display system. The interactive display system may be implemented to provide an electronic whiteboard that enables users to input information to the system by engaging a display with one or more objects. The system may present an image via the display that reflects the inputs received from the user. For example, the display may be dynamically updated to mimic inputs made to a whiteboard by the user via one or more pens and/or an eraser. The interactive display system may implement an underlayer embedded within the display to guide electromagnetic radiation that emanates from an object engaged with the display to one or more detectors by total internal reflection. Due at least in part to the efficiency of the underlayer in guiding the electromagnetic radiation to the detectors, the interactive display system may enhance the speed and/or accuracy of the interpretation of the inputs made by the user.

In some embodiments, the system may include a display, a plurality of detectors, and a processor. The display may include a waveguide that provides an interface surface and an underlayer. The interface surface may be configured such that electromagnetic radiation emanates from an object controlled by the user into the waveguide. The underlayer may be spaced apart from the interface surface within the waveguide and may be configured to guide at least a portion of the electromagnetic radiation that emanates from the object to the detectors by total internal reflection. The underlayer may be formed from a material that diffuses electromagnetic radiation in a predictable manner. For example, in some implementations, the underlayer may diffuse electromagnetic radiation in a uniform manner without regard to the direction of propagation. In some implementations, the underlayer may be formed to direct diffuse the electromagnetic radiation in some other predictable manner. The material forming the underlayer may also be tailored to enhance its ability to act as a waveguide for electromagnetic radiation within one or more predetermined wavelength bands (e.g., near-infrared). The detectors may generate one or more output signals that are related to the intensities of the electromagnetic radiation received by the detectors from the underlayer. The processor may receive the output signals and may determine the position of the object with respect to the interface surface based on the relative intensities of the electromagnetic radiation that is received by the detectors.

In some instances, the interactive display system may include an image generation device that may be controlled by the processor. The processor may control the image generation device to generate an image that is viewable on the display and reflects inputs made to the interactive display system by the user at the interface surface via the object. This may include generating an image that mimics what the display would look like if the interface surface were a whiteboard surface and the object was a pen and/or an eraser. In some instances, the display may be designed for a presentation or demonstration being made by the user, and the inputs made by the user via the object(s) may include inputs that alter the content of the image generated by the image generation device. For example, the size of one or more features of the image may be changed based on the inputs, one or more of the features may be moved around the image, one or more features may be removed from the image, one or more numerical values may be changed in the image, and/or one or more features may otherwise be manipulated based inputs made by the user to the display via the object.

According to some embodiments, one or more of the properties of the electromagnetic radiation emanating from the object may enable information other than positional information about the object to be determined by the processor based on the output signals of the detectors. For example, electromagnetic radiation emanating from the object may enable the object to be differentiated by the processor from one or more other objects. This may enable the processor to determine the positions of a plurality of objects engaged with the interface surface simultaneously. In some instances, the processor may implement the identification of individual ones of a plurality of objects to control the image generation device to generate an image that mimics what the display would look like if the interface surface were a whiteboard and the plurality of objects were different colored pens and/or an eraser. In some implementations, the display may be designed for a presentation or demonstration being made by the user, and the inputs made by the user via the object(s) may include inputs that alter the content of the image generated by the image generation device. In this context, individual ones of the plurality of objects may be associated with individual features in the generated image, and may be used to alter the image of the feature(s) with which they are associated. The one or more properties of the electromagnetic radiation that emanate from the objects that may enable the processor to identify the objects may include a wavelength of the radiation, an intensity of the radiation, an amplitude modulation of the radiation, and/or a polarization of the radiation.

In some embodiments, rather than a whiteboards and/or presentation environment, the interactive display system may be implemented to provide a board game environment. In the board game environment, objects may be positioned on the display such that they emanate electromagnetic radiation into the display and is guided to the detectors by total internal reflection within the underlayer. Based on the detection of this electromagnetic radiation by the detectors, the processor (1) determines position information related to the objects and (2) identifies the individual objects positioned on the display. The image generation device may be controlled by the processor based on these determinations to generate an image on the display that represents the game board used to play a game and, in some cases, representations of game pieces represented by the individual objects in their respective positions on the game board (e.g., the display).

In some instances, the electromagnetic radiation that emanates from the object includes electromagnetic radiation that is reflected and/or scattered by the object. In these instances, electromagnetic radiation may be provided by one or more emitters to an interface layer that forms the interface surface of the display. The electromagnetic radiation provided by the emitters may be trapped within the interface layer by total internal reflection until the object engages the interface surface. When the object engages the interface surface, the total internal reflection of the electromagnetic radiation provided to the interface layer by the one or more emitters may be frustrated such that a portion of this electromagnetic radiation is scattered and/or reflected by the object into the waveguide. At least a portion of the electromagnetic radiation scattered and/or reflected by the object into the waveguide may be guided to the detectors by total internal reflection within the underlayer.

Another aspect of the invention relates to a tool that is configured to input information to an interactive display system. In some embodiments, the tool is configured to emit electromagnetic radiation into the interactive display system that will enable the system to determine the location of the tool. The tool may further be configured to determine information related to its own position, and to modify one or more properties of the electromagnetic radiation that it emits in accordance with the determined position information. For instance, the tool may be configured to determine its attitude with respect to a plane of a display provided by the interactive display system, the rotational position of the tool (or a knob or other component associated with the tool) in the place of the display. In these embodiments, the tool, by way of the electromagnetic radiation that it emits, enables the interactive display system to determine its location and other information related to its position (e.g., its attitude with respect to the plane of the display provided by the interactive display system, its rotational position, etc.).

Yet another aspect of the invention relates to a tool that is configured to input information to an interactive display system. In some implementations, the tool is configured to emit electromagnetic radiation into the interactive display system that will enable the system to determine the location of the tool. The tool may include a controller that controls one or more properties of the electromagnetic radiation emitted by the tool and a receiver that receives control information for the controller. The controller may control the tool such that one or more properties of the electromagnetic radiation emitted by the tool may be modified based on the control information received by the receiver. The receiver may receive control information wirelessly and/or via an electrical contact. In some instances, the control information may cause the controller to modify the one or more properties of the electromagnetic radiation emitted by the tool such that the interactive display system may determine a position of the tool and an identification of the tool based on the emitted electromagnetic radiation.

Still another aspect of the invention relates to a tool management apparatus. The tool management apparatus may be configured to provide control information to one or more tools that are adapted to emit electromagnetic radiation into an interactive display system. The control information provided by the tool management apparatus may include information that dictates one or more properties of the electromagnetic radiation individually for the one or more tools. The control information may dictate the one or more properties of the electromagnetic radiation for the one or more tools such that upon receipt of the electromagnetic radiation emitted by the tools, the interactive display system may differentiate between the one or more tools and determine the positions of the one or more tools based on the received electromagnetic radiation.

These and other objects, features, benefits, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION

Figure 1:
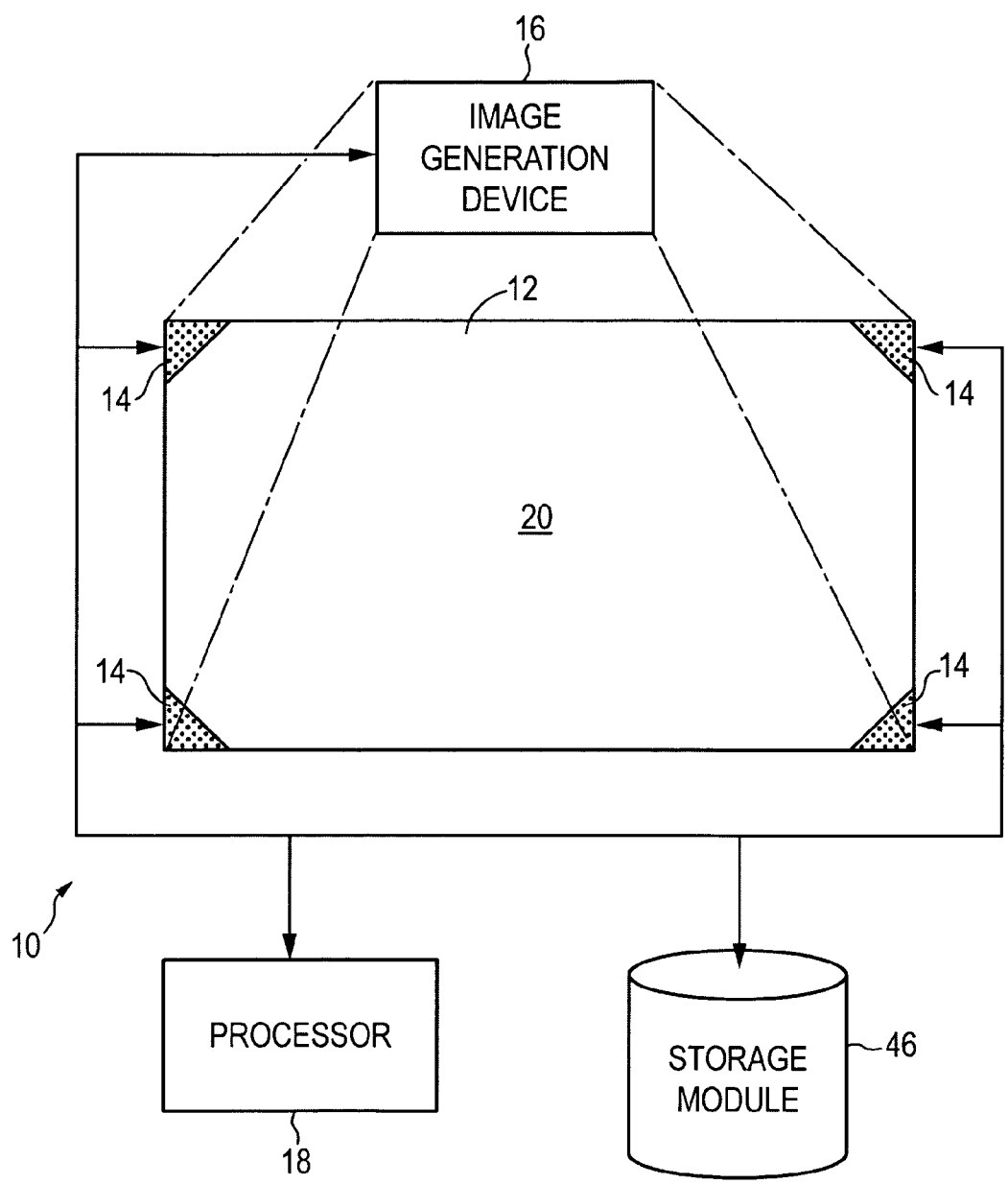
FIG. 1 illustrates an interactive display system, in accordance with one or more embodiments of the invention.

FIG. 1 illustrates an interactive display system 10 according to one or more embodiments of the invention. As is shown, system 10 may include a display 12, one or more photosensitive detectors 14, an image generation device 16, a processor 18, and/or other components. System 10 may accept user input in the form of engagement between display 12 and an object being manipulated by a user. In some instances, system 10 may determine position information related to the object (e.g., a location of the object, a rotational orientation of the object, an attitude of the object with respect to the display, etc.), identify the object, and/or determine other information related to the object. An image generated on display 12 by image generation device 16 may be modified to reflect the information related to the object that is determined by system 10. For example, interactive display system 10 may be implemented as a "whiteboard," and information related to the engagement between the object and display 12 may be implemented to generate a an image that includes a markings and/or erasures along a path of the engagement between the object and display 12. As another example, interactive display system 10 may be implemented as a game board and the object may be a game piece. The image generated by image generation device 16 may be designed to enhance/facilitate the game being played. Other examples also exist.

As was mentioned above, image generation device 16 may operate to generate an image on display 12. Accordingly, in some embodiments, image generation device 16 may include an image projector that projects an image onto display 12. For instance, system 10 may be a "front-projection" system in which the image projector is positioned on the "front" side (e.g., the same side as the user) of display 12. In other instances, system 10 may be a "rear-projection" system in which the image projector is positioned on the "rear" side (e.g., opposite from the user) of display 12. Image projectors that may be included in image generation device 16 include projectors that utilize color-wheels, projectors utilizing DLP technology (e.g., DMD devices), projectors that implement electrochemical modulators (e.g., LCD stacks, LCOS chips, etc.), scanning beam projectors (e.g., CRT projectors, scanning beam MEMS projectors, etc.) and/or other image generating projectors. In some implementations, image generation device 16 may include a device that is integrated with display 12 as a single apparatus. For example, display 12 and image generation device 16 may be included within a common rear-projection television apparatus. In other embodiments, image generation device 16 may include a CRT television or monitor, a plasma television or monitor, an LCD television or monitor, an SED television or monitor, an OLED television or monitor, an LED television or monitor, or other television or monitor systems.

Detectors 14 may monitor one or more properties of electromagnetic radiation. For instance, the one or more properties may include intensity, directionality, wavelength, amplitude, amplitude modulation, polarization, and/or other properties. Detectors 14 may include one or more photosensitive sensors (e.g., one or more photosensitive diodes, CCD arrays, CMOS arrays, line sensors etc.) that receive electromagnetic radiation, and may output one or more output signals that are indicative of one or more of the properties of the received electromagnetic radiation. In some implementations, detectors 14 may include spatial filters (e.g., one or more apertures, slits, sets of slits, refractive elements, etc.) to filter the electromagnetic radiation before it becomes incident on the photosensitive sensor(s). In some instances, detectors 14 may be optically coupled to display 12 to receive electromagnetic radiation from display 12, and may output one or more output signals that are indicative of one or more properties of the electromagnetic radiation received from display 12. Based on these output signals, information related to the object may be determined (e.g., position, identity, etc.).

Although the description of system 10 is described particularly herein with respect to the determination of information related to an object actually engaging display 12, this is not intended to be limiting. In some instances, electromagnetic radiation emanating from an object not actually in contact with display 12 may still provide electromagnetic radiation to system 10 that may be processed to determine information related to the object (e.g., position, identification, etc.) in substantially the same manner as electromagnetic radiation emanating from objects that are physically in contact with display 12.

Display 12 may provide an interface surface 20 configured to be engaged by the user with the object. Images generated by image generation device 16 may be visible to the user at or near interface surface 20. As can be seen in FIG. 1, detectors 14 may be disposed at or near the periphery of display 12. Display 12 may be configured such that if the object is engaged with interface surface 20, electromagnetic radiation emanates from the object such that a portion of the electromagnetic radiation is provided to detectors 14. Based on the output signals generated by detectors 14 in response to the electromagnetic radiation emanated by the object at the engagement between the object and interface surface 12, information related to the object may be determined by processor 18.

Figure 2:
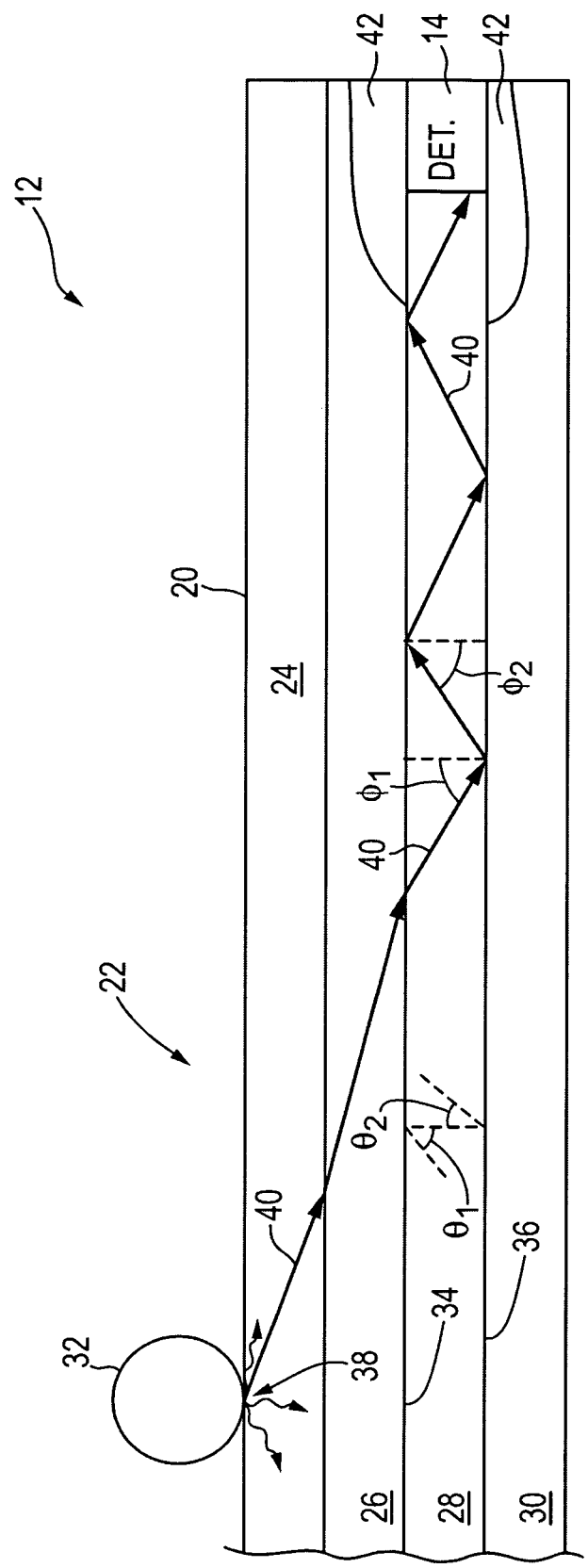
FIG. 2 illustrates a waveguide, according to one or more embodiments of the invention.

For example, FIG. 2 illustrates a sectional view of display 12. Display 12 may include a waveguide 22. Waveguide 22 may include an interface layer 24, a first boundary layer 26, an underlayer 28, and a second boundary layer 30. Waveguide 22 may be configured to receive electromagnetic radiation emanating from an object 32 at an engagement between object 32 and interface surface 20, and guide at least a portion of the received electromagnetic radiation to detector 14 by total internal reflection.

Interface layer 24 may be disposed within waveguide 20 to provide interface surface 20. Interface layer 24 may be formed from a substantially transparent material having a first index of refraction. In some instances, the material forming interface layer 24 may be relatively rigid, in order to ensure a level of rigidity in interface surface 20. It should be appreciated that although interface surface 20 is illustrated as being exposed to ambient atmosphere, other embodiments exist in which external layers may be applied to interface layer 24 on interface surface 20. These external layer(s) may include one or more anti-reflective layers, one or more hydrophobic layers, one or more hydrophilic layers, one or more scratch resistant layers, and/or one or more other external layers. The external layer(s) may be applied as a coating (e.g., via sputtering), as a film, and/or otherwise applied.

For example, in one embodiment, the external layer(s) may include a disposable layer that is positioned over interface surface 20. The disposable layer may protect interface surface 20 from scratches, stains, impacts, and/or other stresses. The disposable layer may be removed and replaced by another disposable layer. In one embodiment, the disposable layer may be included in a set of disposable layers that are positioned over interface surface 20 and when the most external disposable layer has been used up the user may remove the most external disposable layer to expose the next most external layer, and so on.

Underlayer 28 may be spaced apart from interface layer 28 within waveguide 22. Underlayer 28 may be disposed between boundary layers 26 and 30. In some instances, underlayer 28 may be formed from a material that has a second index of refraction that is different from the first index of refraction. In some instances, the second index of refraction may be higher than the first index of refraction (i.e., the index of refraction of interface layer 24). The material that forms underlayer 28 may be designed to diffuse electromagnetic radiation traveling within underlayer 28 by a predetermined amount irrespective of the direction of the path of the electromagnetic radiation within underlayer 28.

Boundary layers 26 and 30 may be formed from relatively transparent materials. In some implementations, boundary layers 26 and 30 may have a share a common composition. The materials used to form boundary layers 26 and 30 may have refractive indices that are lower than the first and second refractive indices. In embodiments in which the refractive indices of boundary layers 26 and 30 are less than the second refractive index (i.e., the refractive index of underlayer 28), total internal reflection mirrors 34 and 36 may be formed within waveguide 22. More particularly, the difference in refractive index between first boundary layer 26 and underlayer 28 may form total internal reflection mirror 34 such that electromagnetic radiation that becomes incident on total internal reflection mirror 34 from within underlayer 28 at an angle of incidence that is greater than a critical angle (illustrated in FIG. 2 as $\theta_1$) of total internal reflection mirror 34 is reflected back into underlayer 28. Similarly, the difference in refractive index between second boundary layer 30 and underlayer 28 may form total internal reflection mirror 36 such that electromagnetic radiation that becomes incident on total internal reflection mirror 36 from within underlayer 28 at an angle of incidence that is greater than a critical angle (illustrated in FIG. 2 as $\theta_2$) of total internal reflection mirror 36 is reflected back into underlayer 28.

While in FIG. 2 layers 24, 26, 28, and 30 are illustrated as single layers, this is not intended to be limiting. In some implementations, one or more of layers 24, 26, 28, or 30 may include a plurality of sub-layers. A plurality of sub-layers forming a layer may include sub-layers of the same or different materials. For example, one or both of boundary layers 26 and 30 may include a plurality of sub-layers formed from a plurality of different materials.

As has been mentioned above, detectors 14 may receive electromagnetic radiation from display 12. More particularly, detectors 14 may be optically coupled to waveguide 22 to received electromagnetic radiation therefrom. For instance, as is shown in FIG. 2, detector 14 may be coupled to underlayer 28 such that electromagnetic radiation may be guided within underlayer 28 to detector 14 by total internal reflection at total internal reflection mirrors 34 and 36. In these embodiments, detector 14 may be formed integrally with waveguide 22 (e.g., disposed within waveguide 22), or detector 14 may be formed separately with waveguide 22 and may be positioned at the periphery of waveguide 22 to receive electromagnetic radiation therefrom. In other embodiments, additional optical components (e.g., optical fibers, mirrors, lenses, etc.) may used to direct electromagnetic radiation from waveguide 22 to detector 14.

As object 32 engages interface surface 20, electromagnetic radiation 38 emanates from object 32 into waveguide 22. As will be discussed further below, electromagnetic radiation 38 may include electromagnetic radiation emitted from object 32 and/or electromagnetic radiation reflected and/or scattered by object 32. Electromagnetic radiation 38 includes electromagnetic radiation 40 that propagates through layers 24, 26, and 28 to become incident on second total internal reflection mirror 36 at an angle of incidence (illustrated as in FIG. 2 $\phi_1$) that is greater than critical angle $\theta_2$ and is totally internally reflected back into underlayer 28. As can be seen, electromagnetic radiation 40 may then become incident on total internal reflection mirror 34 at an angle of incidence (illustrated in FIG. 2 as $\phi_2$) that is greater than critical angle $\theta_1$ and is totally internally reflected back into underlayer 28. Thus, by virtue of its path through waveguide 22, electromagnetic radiation 40 may become trapped by total internal reflection within underlayer 28, which guides electromagnetic radiation 40 to detector 14.

Guiding electromagnetic radiation 40 to detectors 14 via underlayer 28 may provide several enhancements to system 10. For instance, loss factors within underlayer 28 may be (1) relatively independent of the direction in which electromagnetic radiation 40 is traveling, and (2) relatively predictable. As another example, underlayer 28 may be formed from a material that is particularly suitable to guide electromagnetic radiation within a specific wavelength range (e.g., near-infrared, etc.). Other layers, such as interface layer 24, may not be as well suited to guiding an optical signal due to other considerations related to the performance of these layers (e.g., transparency, ruggedness, exposure to atmosphere, etc.).

In some implementations, waveguide 22 may include microstructures that enable a larger amount of electromagnetic radiation that emanates from object 32 to become trapped within underlayer 28 by total internal reflection. These microstructures may be formed in one or more of boundary layers 26 and 30, or underlayer 28. A more thorough explanation of some examples of suitable microstructures may be found within co-pending U.S. patent application Ser. No. 11/480,865, entitled "Optical Touchpad System and Waveguide for Use Therein," and filed Jul. 6, 2006. The contents of this co-pending application are hereby incorporated by reference into the present disclosure.

In some embodiments, waveguide 22 may include an absorptive material 42 disposed adjacent to underlayer 28 near detector 14. Absorptive material 42 may be designed to absorb electromagnetic radiation that might otherwise reach detector 14 without being totally internally reflected within underlayer 28. This may include electromagnetic radiation that is Fresnel reflected at a boundary between two of layers 24, 26, 28, or 30 and/or at a boundary between waveguide 22 and ambient atmosphere. By shielding detector 14 in this manner, absorptive material 42 may enhance a signal to noise ratio of detector 14. Absorptive material 42 may be substantially index matched to one or both of boundary layers 26 and 30, thereby ensuring that substantially any angles of incident light that would not be totally internally reflected at total internal reflection mirrors 34 and 36 may be absorbed. In other instances, absorptive material 42 may be located on a side of boundary layers 26 and/or 30 opposite from underlayer 28. This may enable absorptive material 42 to include materials that are not index matched to boundary layers 26 and/or 30. Absorptive material 42 may be applied by print, by paint, by UV cure, by heat cure, or by other methods. Absorptive material 42 may include paint, silicone, polymer, emerald, or other materials.

Upon receiving electromagnetic radiation 40, detector 14 may generate an output signal that represents one or more properties of electromagnetic radiation 40. For example, the output signal of detector 14 may represent an intensity of electromagnetic radiation 40, a wavelength of electromagnetic radiation 40, a polarization of electromagnetic radiation 40, and/or other properties of electromagnetic radiation 40.

Referring back to FIG. 1, processor 18 may be in operative communication with detectors 14 to receive the output signals generated by detectors 14. This operative communication may be accomplished via one or more of wireless communication media, wired communication, a discrete information path, a networked information path, and/or other forms of operative communication between electronic components. It should be appreciated that although processor 18 is shown in FIG. 1 as a single entity, this is for illustrative purposes only. In some implementations, processor 18 may include a plurality of processing units. These processing units may be physically located within the same device, or processor 18 may represent processing functionality of a plurality of devices operating in coordination. In instances in which a plurality of devices are implemented, operative communications links may be formed between the devices to enable communication and coordination therebetween.

For example, in some embodiments, processor 18 may include one or more processors external to system 10 (e.g., a host computer that communicates with system 10), one or more processors that are included integrally in optical touchpad system 10, or both. For example, the processors may include one or more semi-conductive device (e.g., an ASIC, an FPGA, a DSP, etc.), or other processors, integrated with one or more of detectors 14. These processors may be operatively connected with one or more external processors. The external processors may, in some cases, provide redundant processing to the processors that are integrated with detectors 14, and/or the external processor may provide additional processing to determine additional information related to the object and/or an engagement between display 12 and the object.

Based on the output signals generated by detectors 14, processor 18 may determine information related to an object that is engaged with interface surface 20 of display 12. For example, processor 18 may determine a position of the object with respect to interface surface 20. As was discussed above, display 12 includes an underlayer (e.g., underlayer 28 of FIG. 2) that guides electromagnetic radiation that emanates from the object to detectors 14 by total internal reflection. In some instances, the underlayer is formed from a material that diffuses electromagnetic radiation equally in all directions. In these instances, the intensity of the electromagnetic radiation that emanates from the object and is guided to a given one of detectors 14 in FIG. 1 will vary as a function of the distance between the object and the given detector 14. More specifically, in one embodiment, as the distance between the object and detector 14 increases, the more electromagnetic radiation that emanates from the object will diffuse within underlayer 28 before arriving at detector 14, thereby causing the intensity of the electromagnetic radiation at detector 14 to decrease. In one embodiment, processor 18 may implement this phenomenon to determine the position of the object from the output signals generated by detectors 14.

Figure 3:
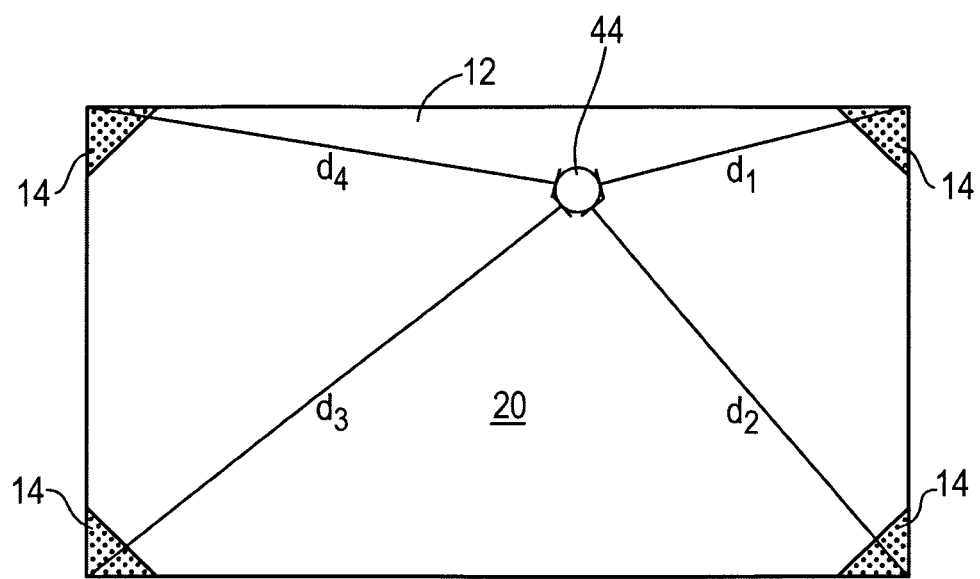
FIG. 3 illustrates a determination of a position of an object on a display, in accordance with one or more embodiments of the invention.

Turning to FIG. 3, the determination of the position of the object based on the intensity of the electromagnetic radiation that emanates from the object to detectors 14 is illustrated. FIG. 3 shows an object 44 that is engaged with interface surface 20 of display 12. At the position shown, object 44 is a certain distance from each detectors 14 (these distances are illustrated as $d_1$-$d_4$). Due to the differences between distances $d_1$-$d_4$, the amount of electromagnetic radiation that emanates from object 44 and is diffused within the underlayer of display 12 will be different for individual ones of detectors 14. This may cause the intensities of electromagnetic radiation received by detectors 14 from the underlayer to differ. Based on the relative intensities of the electromagnetic radiation received by detectors 14, as represented by the output signals generated by detectors 14, processor 18 may determine the position of object 44 on interface surface 20.

It should be apparent that although FIGS. 1 and 3 illustrate embodiments of system 10 in which display 12 is shaped as a parallelogram (e.g., a rectangle) with one of detectors 14 positioned at each of the corners, other implementations exist. For example, this technique for determining the position of object 44 may be implemented using three or more detectors positioned to receive electromagnetic radiation for display 12 at any set of locations on display 12. In other words, the above-described technique for determining the position of object 44 may be employed with more or fewer detectors, positioned at positions other than those illustrated for detectors 14 in FIGS. 1 and 3.

Returning to FIG. 1, in some embodiments, system 10 may include a storage module 46. Storage module 46 may be operatively coupled to processor 18 and may be implemented to store information associated with system 10. For instance, storage module 46 may be used to store a record of the movement of one or more objects with respect to interface surface 20 so that their movements may be recreated. This recreation may include promptings to a user to actually position one or more objects that correspond to the original one or more objects with respect to interface surface 20 to recreate the movement of the original one or more objects. In other implementations, this re-creation may include providing images on display 12 by image generating device 16 that convey the recreation of the movements of the original one or more objects without a corresponding one or more physical objects actually being moved around interface surface 20. In some implementations, storage module 46 may be used to store recently determined position information in order to refine a final position determination (e.g., by averaging, or otherwise aggregating, such determinations).

Figure 4:
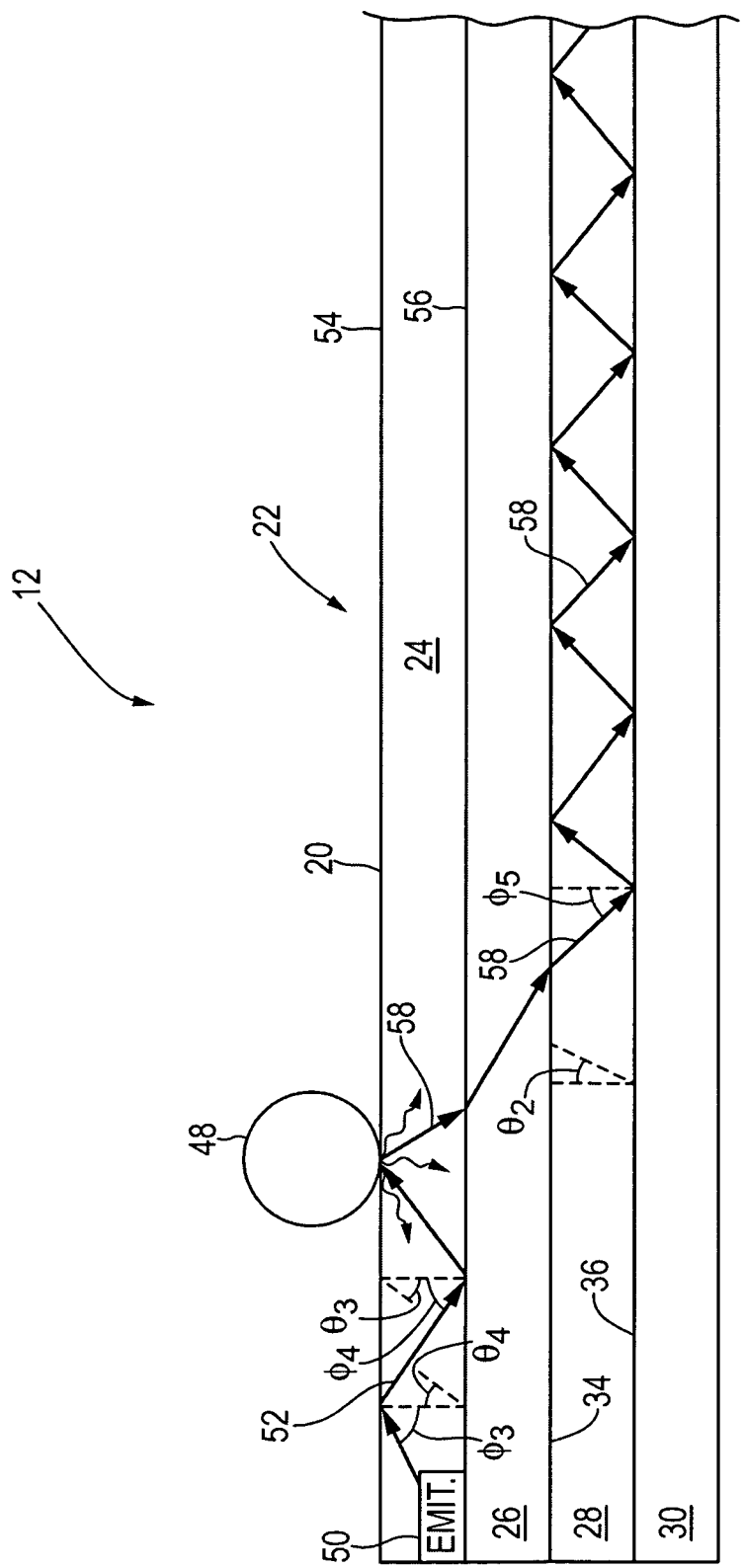
FIG. 4 illustrates a waveguide, according to one or more embodiments of the invention.

In some embodiments, the electromagnetic radiation that emanates from an object at an engagement between the object and interface surface 20 may include electromagnetic radiation that is reflected and/or scattered by the object. For example, FIG. 4 shows a sectional view of display 12 that illustrates how an object 48 engaged with interface surface 20 may scatter and/or reflect electromagnetic radiation into waveguide 22 associated with display 12. In the embodiments shown, system 10 may include one or more emitters 50 that emit electromagnetic radiation 52 into interface surface 20.

Emitters 50 may be optically coupled with waveguide 22 so that electromagnetic radiation emitted by emitters 50 may be directed into waveguide 22. Emitters 50 may include one or more Organic Light Emitting Devices ("OLEDs"), lasers (e.g., diode lasers or other laser sources), Light Emitting Devices ("LEDs"), Hot Cathode Fluorescent Lamps ("HCFLs"), Cold Cathode Fluorescent Lamps ("CCFLs") incandescent lamps, halogen bulbs, received ambient light, and/or other electromagnetic radiation sources. In some embodiments, emitters 50 may be disposed at the periphery of waveguide 22 in system 10. However, this is not limiting and alternative configurations exist. For example, emitters 50 may be disposed away from waveguide 22 and electromagnetic radiation produced by emitters 22 may be guided to waveguide 18 by additional optical elements (e.g., one or more optical fibers, etc.). As another example, some or all of emitters 22 may be embedded within waveguide 22 beneath interface layer 24 at locations more central to system 10 than that shown in FIG. 4.

As has been mentioned previously, the index of refraction of interface layer 24 (i.e., the first index of refraction) may be greater than that of boundary layer 26. By virtue of the magnitude of the first index of refraction with respect to ambient atmosphere and boundary layer 26, total internal reflection mirrors 54 and 56 may be formed between interface layer 24 and ambient atmosphere and between interface layer 24 and boundary layer 26, respectively. Total internal reflection mirror 54 such that if electromagnetic radiation 52 becomes incident on total internal reflection mirror 54 from within interface layer 24 at an angle of incidence (illustrated in FIG. 4 as $\phi_3$) that is greater than a critical angle (illustrated in FIG. 4 as $\theta_3$) of total internal reflection mirror 54 it is reflected back into interface layer 24. Similarly, the difference in refractive index between first boundary layer 26 and interface layer 24 may form total internal reflection mirror 56 such that if electromagnetic radiation 52 becomes incident on total internal reflection mirror 56 from within interface layer 24 at an angle of incidence (illustrated in FIG. 4 as $\phi_4$) that is greater than a critical angle (illustrated in FIG. 4 as $\theta_4$) of total internal reflection mirror 56 it is reflected back into interface layer 24.

If object 48 is engaged with interface surface 20, total internal reflection at total internal reflection mirror 54 may be frustrated such that electromagnetic radiation 52 leaks from interface surface 20 and becomes incident on object 48. At least a portion of the leaked electromagnetic radiation 52 (illustrated in FIG. 4 as electromagnetic radiation 58) is reflected and/or scattered by object 48 back into waveguide 22 such that it becomes incident on total internal reflection mirror 34 at an angle incidence (illustrated in FIG. 4 as $\phi_5$) that is greater than critical angle $\theta_2$ of total internal reflection mirror 34. Thus, electromagnetic radiation 58 becomes trapped within underlayer 28 and may be guided to detectors 14 by total internal reflection in the manner described above.

In implementations in which the electromagnetic radiation that emanates from an object engaged with interface surface 20 includes reflected and/or scattered radiation, the object may include an animate object (e.g., a fingertip, a palm, etc.) or an inanimate object (e.g., a stylus, a game piece, a marker, some other tool). The inanimate objects may include objects that are designed to reflect and/or scatter radiation so that an identity of the object may be determined based on one or more properties of the reflected and/or scattered radiation. For instance, an inanimate object may include an optical element that is designed to engage interface surface 20 and reflect and/or scatter electromagnetic radiation in a predetermined wavelength range, with a predetermined polarization, and/or with other predetermined properties. In some of these instances, the optical element may include a half mirror that reflects a proportion of the incident electromagnetic radiation and the identity of the object may be determined based on this proportion of reflected electromagnetic radiation.

It should be appreciated that determining an identity of an object engaged with interface surface 20 may enable system 10 to provide a variety of functionalities. For example, in some implementations, it may enable processor 18 to determine positions of multiple objects engaged with interface surface 20 simultaneously. In some implementations, it may enable an image to be provided to display 12 by image generation device 16 that reflects the different objects. For example, in a "whiteboard" environment, the image provided to display 12 may treat one object as a red pen (e.g., leaving a read mark in the path of its engagement with interface surface 20), another object as a blue pen, and another object as an erasure (e.g., erasing marks in the path of its engagement with interface surface 20). In some implementations, one or more of the object may include actual pens and/or erasers, that may physically paint markings onto and/or remove physical markings from the whiteboard, in addition to providing input to system 10 at display 12. As another example, in an environment in which display 12 is being implemented as a board game (e.g., checkers), the image provided to display 12 may treat an object of one object-type as being on one "team" (e.g., black) and an object of a second object-type as being on another "team" (e.g., red). Or, in this environment, an object may be identified as a type of game piece (e.g., a knight in chess), and the image generated by image generation device 16 may reflect this identity.

It should be appreciated that the determination of the position of an object based on electromagnetic radiation that is scattered and/or reflected by the object at an engagement between the object and interface surface 20 as described above is not intended to be limiting. Other implementations exist in which alternative techniques may be implemented to determine the position of the object based on electromagnetic radiation that is scattered and/or reflected by the object. For example, FIG. 5 illustrates one alternative technique.

Figure 5:
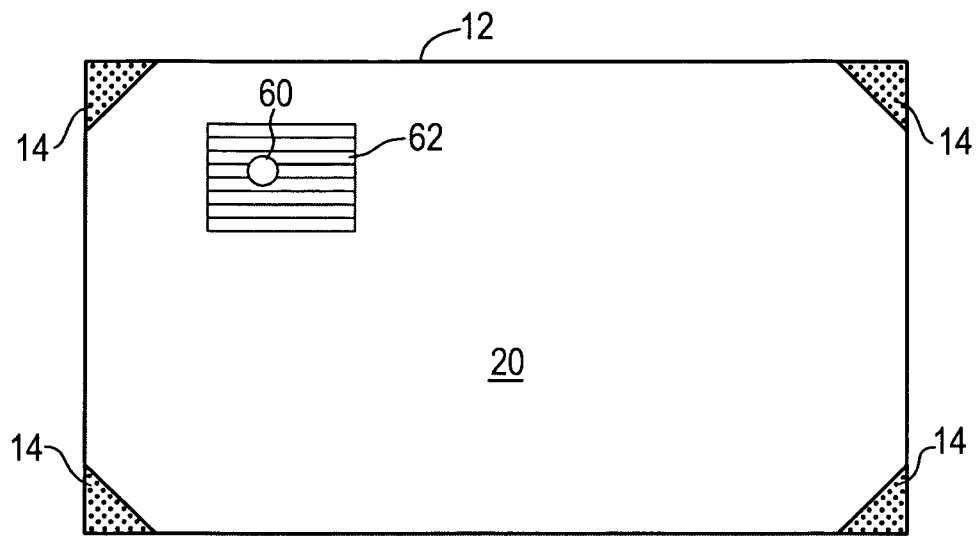
FIG. 5 illustrates a determination of a position of an object on a display, in accordance with one or more embodiments of the invention.

In the implementation of system 10 illustrated in FIG. 5, an area of signal electromagnetic radiation may be generated by image generation device 16 on display 12. The implementation of system 10 may be practicable if image generation device 16 is used to project an image on display 12 from the "rear" side of display 12 (e.g., system 10 includes a rear-projection system). The area of signal electromagnetic radiation may include electromagnetic radiation with one or more predetermined properties. The one or more predetermined properties may include a wavelength, an intensity, an amplitude modulation, a polarization, and/or other properties. The area of signal electromagnetic radiation may by provided to a predetermined area size of display 12 (e.g., a predetermined number of pixels). The area of signal electromagnetic radiation may be provided to display 12 in a spatially sequential manner (e.g.; scanned across display 12) in a predetermined manner (e.g., at predetermined speed, etc.). When the area of signal electromagnetic radiation reaches the location on display 12 where an object 60 is engaged with interface surface, object 60 may reflect and/or scatter the incident signal electromagnetic radiation back into display 12 such that a portion of the signal electromagnetic radiation is guided within display 12 to one or more of detectors 14 in the manner illustrated in FIG. 2. Processor 18 may implement the output signal(s) generated by the one or more detectors 14 in response to the signal electromagnetic radiation to determine the point in time at which the signal electromagnetic radiation was incident on object 60. Based on the location of display 12 to which image generation device 16 was providing the area of signal electromagnetic radiation at this point in time, processor 18 may determine the location of object 60 on interface surface 20.

Referring to FIG. 5, rather than scanning the entire area of display 12 with the area of signal electromagnetic radiation, processor 18 may control image generation device 16 to scan only a zone of interest 62 around a last measured position of object 60 in interface surface 20. Thus, as the last measured position of object 60 moves with respect to interface surface 20, the position of the zone of interest 62 may also be adjusted. This may enhance the speed and/or accuracy of system 10 in determining the location of object 60. This may further enable the positions of multiple objects to be determined. Additional description with respect to providing an area of electromagnetic radiation to interface surface 20 of display 12 in a spatially sequential manner to track the position of one or more objects may be found in co-ending U.S. Provisional Patent Application Ser. No. 60/787,164, entitled "A System and a Method of Determining a Position of a Scattering/Reflecting Element on the Surface of a Radiation Transmissive Element," and filed Mar. 30, 2006. The contents of this co-pending application are hereby incorporated by reference into the present disclosure.

Figure 6:
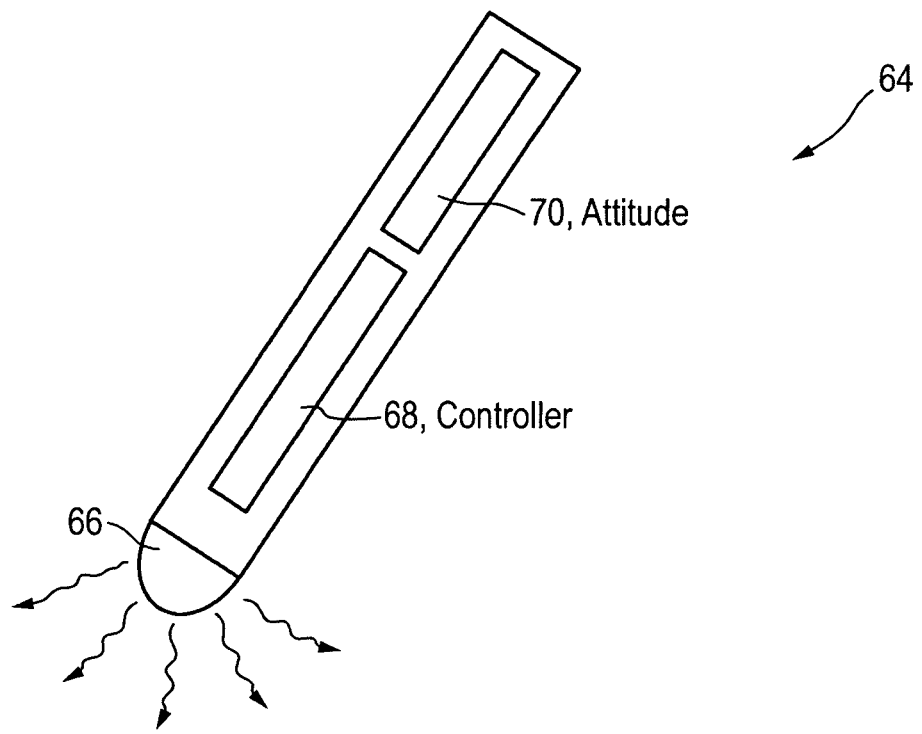
FIG. 6 illustrates a tool that emits electromagnetic radiation, according to one or more embodiments of the invention.

In some embodiments, the electromagnetic radiation emanating from an object engaged with display 12 may include electromagnetic radiation emitted by the object. For example, FIG. 6 illustrates a tool 64 capable of emitting electromagnetic radiation into display 12. Tool 64 includes an emission module 66 that includes one or more emitters that emit electromagnetic radiation, and a controller 68. Tool 64 may include a stylus, a light pen, a game piece, a marker, a joystick, a knob, a button, a key, an assembly of keys (e.g., a keyboard), and/or other tools that enable a user to input information to system 10 by engaging tool 64 with interface surface 20 of display 12.

Controller 68 may control emission module 66 to modify one or more properties of the electromagnetic radiation emitted by the one or more emitters of emission module 66. The one or more properties may include a wavelength, an intensity, an amplitude modulation, a polarization, and/or other properties. Controller 68 may control emission module 66 to modify one or more properties of the electromagnetic radiation to convey information about tool 64 to system 10. The information may include information related to the position of tool 64, such as an attitude with respect to interface surface 20, identification information that enables processor 18 to identify tool 64, and/or other information.

In some implementations, tool 64 may include an attitude module 70. Attitude module 70 may determine information related to an attitude of tool 64 with respect to interface surface 20 (e.g., "tilt" of tool 64). This information may then be provided to controller 68, which may control emission module 66 such that the electromagnetic radiation emitted by emission module 66 indicates the attitude of tool 64. When tool 64 is engaged with display 12 in system 10 of FIG. 1, for example, the electromagnetic radiation emitted by emission module 66 may be provided to detectors 14 in the manner illustrated in FIG. 2. Based on the output signals of detectors 14 in response to the received electromagnetic radiation, processor 18 of system 10 (e.g., FIG. 1) may determine the attitude of tool 64. This determination of the attitude of tool 64 may be in addition to the position of the engagement between tool 64 and interface surface 20 as described above.

Of course, in some implementations, the tilt of tool 64 may be determined by system 10 without the type of assistance discussed above. For instance, if the directional emission of tool 64 is fixed, or modulated in a predetermined manner, changing the tilt of tool 64 may change the wavefront of the electromagnetic radiation that is guided to detectors 14 by waveguide. In such instances, the intensity of the electromagnetic radiation may be greater in the direction in which tool 64 is pointing.

As was mentioned above, in some instances, one or more layers within waveguide 22 may be formed from a plurality of sublayers. For example, underlayer 28 may be formed from a plurality of sublayers that form two or more sub-underlayers that may facilitate the determination of the tilt of tool 64. The two or more sub-underlayers may be capable of guiding electromagnetic radiation by total internal reflection to detectors 14. The sub-underlayers may be disposed within waveguide 22 in parallel to each other such that an upper sub-underlayer may trap a portion of electromagnetic radiation that is returned to waveguide by an object, while successive sub-underlayers may trap residual portions of the radiation. Then, based on one or more of the properties of the radiation trapped in the various sub-underlayers, information related to the position of the object may be determined. For instance, in an implementation in which underlayer 28 includes two sub-underlayers, the wavefronts of the electromagnetic radiation received by the separate sub-underlayers may be offset with each other. By determining this offset, the tilt of tool 64 may be determined.

In some instances, controller 68 may control emission module 66 to modify one or more properties of the electromagnetic radiation emitted by emission module 66 to convey identification information that enables processor 18 (e.g., FIG. 1) to determine an identity of tool 64. As was discussed above with respect to objects that emanate electromagnetic radiation into display 12 (e.g., FIG. 1) by reflecting and/or scattering electromagnetic radiation, determining an identity of tool 64 may provide various enhancements to the functionality of system 10. These enhancements include the enhancements mentioned previously with respect to determining information related to the positions of multiple tools simultaneously, and generating an image on display 12 that represents information related to the identity of the tool in a "whiteboard" environment and/or a "game board" environment, as well as other environments. In some embodiments, the control of controller 68 over emission module 66 may be "static." This may include embodiments in which the one or more properties of the electromagnetic radiation that are emitted by emission module 66 to convey identification information may be substantially fixed. However, in other embodiments, the control of controller 68 over emission module 66 may be "dynamic." In these embodiments, controller 68 may cause the one or more properties of the electromagnetic radiation emitted by emission module 66 to change in order to facilitate differentiation between a plurality of tools in use.

Figure 7:
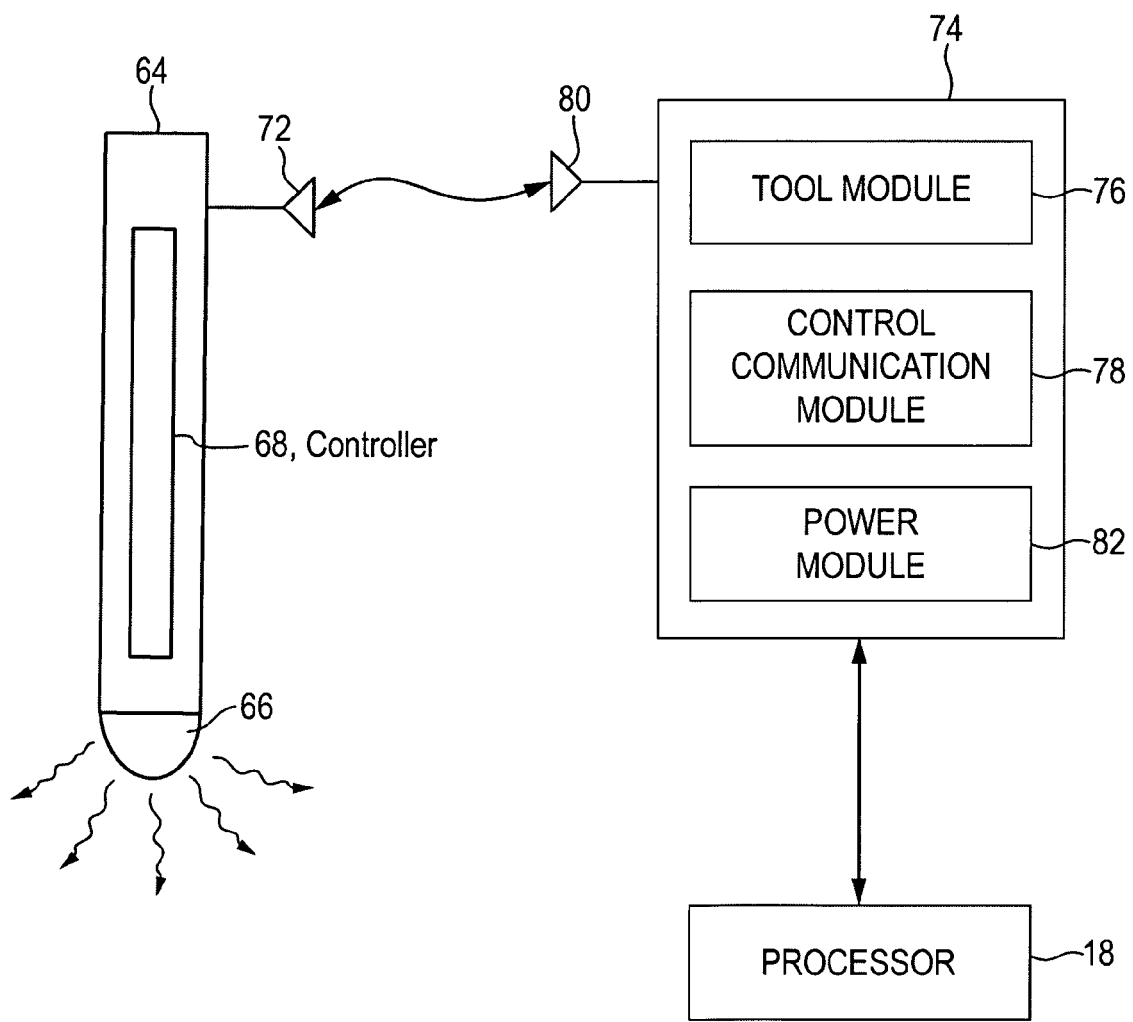
FIG. 7 illustrates a tool and a tool management apparatus, in accordance with one or more embodiments of the invention.

For example, FIG. 7 illustrates some embodiments in which tool 64 includes a transmitter/receiver 72. Transmitter/receiver 72 may be configured to transmit information to and/or receive information from a tool management apparatus 74. Tool management apparatus 74 may include a tool module 76, a control communication module 78, a transmitter receiver 80, and/or other components.

Transmitter/receiver 80 may be configured to transmit information to and/or receive information from transmitter/receiver 72 associated with tool 64. Transmitter/receivers 72 and 80 may be configured to exchange information via wireless and/or wired communication.

Tool module 76 may be configured to determine information that dictates one or more properties of the electromagnetic radiation emitted by tool 64. This may include coordinating the one or more properties of the electromagnetic radiation emitted by tool 64 and one or more other tools being used in conjunction with tool 64. The one or more properties may include the wavelengths of the electromagnetic radiation, the intensities of the electromagnetic radiation, the amplitude modulations of the electromagnetic radiation, the polarizations of the electromagnetic radiation, and/or other properties of the electromagnetic radiation.

For instance, in one embodiment, tool module 76 may determine information that dictates to the tools being used (e.g., tool 64) an amplitude modulation frequency for each of the tools. Tool management apparatus 74 may then transmit to each tool the amplitude modulation frequency at which it should emit electromagnetic radiation via transmitter/receiver 72. In another embodiment, the amplitude modulation frequencies of the tools may be fixed. However, tool module 76 may determine a timing pattern for the tools such that only one tool at a time is emitting a substantial amount of electromagnetic radiation. The timing pattern may then be relayed to the tools via transmitter/receiver 72.

It should be appreciated that in addition to managing individual tools in by determining information that dictates one or more properties of electromagnetic radiation to be emitted by the tools, tool management apparatus 74 may also manage one or more emitters that emit electromagnetic radiation to be reflected and/or scattered by objects engaged with display 12. For example, tool management apparatus 74 may determine information that dictates on or more properties of the electromagnetic radiation emitted by emitter 50 of FIG. 4. This may enable objects that interact passively with electromagnetic radiation at display 12 to be differentiated from tools, such as tool 64, that emit their own electromagnetic radiation.

In some implementations, tool management apparatus 74 may be operatively connected with processor 18. In these implementations, control communication module 78 may communicate with processor 18 to coordinate the determination by tool module 76 of information that dictates the one or more properties of the electromagnetic radiation emitted by the tools (e.g., tool 64) being used. This may include providing processor 18 with information that will enable processor 18 to identify the tools based on the output signals of detectors 14 in response to electromagnetic radiation emitted by the tools. In other instances, this may include receiving information from processor 18 related to the manner in which tool module 76 should dictate the one or more properties of the electromagnetic radiation emitted by the tools.

According to various embodiments, tool management apparatus 74 may include a power module 82. Power module 82 may be configured to provide power to a tool (e.g., tool 64) that is operatively connected with tool management apparatus 74. The power provided by power module 82 to a tool may be used by the tool to recharge a power source (e.g., a battery, etc.) associated with the tool.

Figure 8:
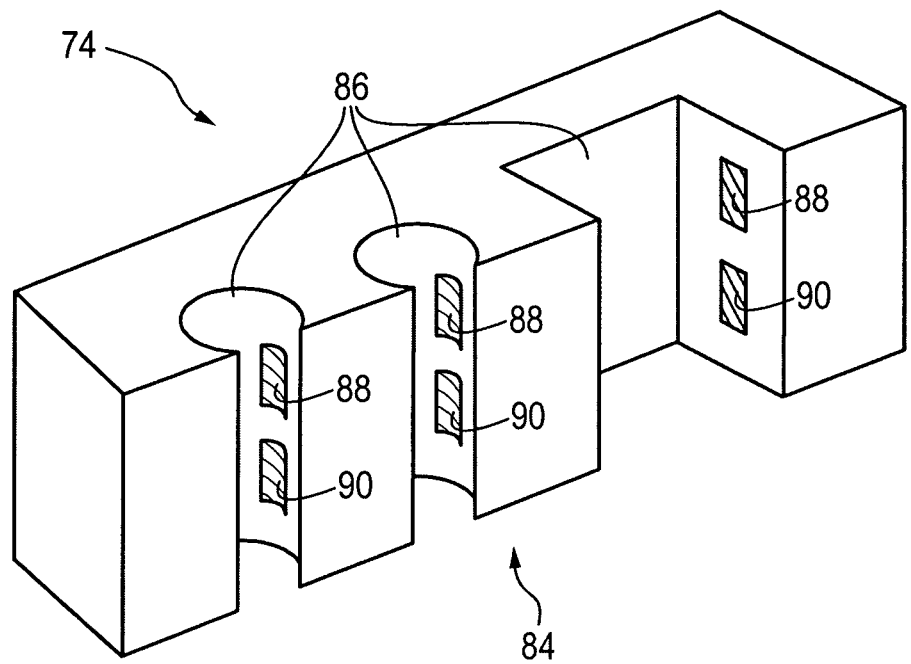
FIG. 8 illustrates a tool management apparatus, according to one or more embodiments of the invention.

FIG. 8 illustrate some embodiments of tool management apparatus 74 including a docking station 84. Docking station 84 may include one or more docking bays 86 which may be configured to receive one or more tools for use with system 10 (e.g., FIG. 1). Docking bays 86 may be shaped to releasably grasp predetermined tools. For instance, in embodiments in which display 12 of system 10 is implemented to provide a "whiteboard" environment docking station may include one or more docking bays shaped to releasably grasp one or more tools shaped as pens and one or more tools shaped as erasers. Each of docking bays 86 may include an electrical contact 88. Electrical contact 88 may function as transmitter/receiver 80 by providing a conduit through which information may be exchanged with a tool via a corresponding electrical contact disposed on the tool. Similarly, each of docking bays 88 include a power contact 90. Power contact 90 may function as power module 82 to provide power to a tool via a corresponding electrical contact disposed on the tool. In some implementations, one or both of electrical contacts 88 and 90 may be embodied as electrical ports. In one embodiment, both of electrical contacts 88 and 90 may be provided by a common electrical port.

Figure 9:
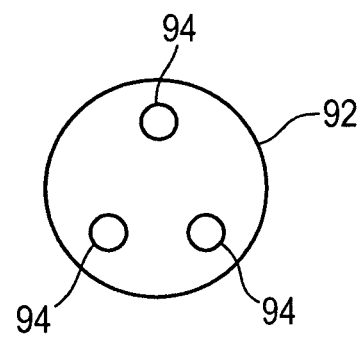
FIG. 9 illustrates a tool that emits electromagnetic radiation, according to one or more embodiments of the invention.

FIG. 9 illustrates a tool 92 that includes a plurality of optical elements 94. Optical elements 94 may be designed to emanate electromagnetic radiation when engaged with interface surface 20 of display 12 (e.g., FIG. 1). Optical elements 94 may include one or more emitters and/or one or more surfaces designed to reflect and/or scatter electromagnetic radiation into display 12. In some implementations, the electromagnetic radiation emanated by one or more of optical elements 94 may have one or more properties that are different than one or more properties of the electromagnetic radiation that emanates from the others of optical elements 94. This may enable processor 18 to determine the positions of each of optical elements 94 on interface surface 20 with respect to the others of optical elements 94. Determining the relative positions of optical elements 94 may enable processor 18 to determine a rotational orientation of tool 92. Tracking the rotational orientation of tool 92 may enable tool 92 to be actuated in a rotational manner by a user to provide input to system 10 (e.g., turning tool 92 like a knob). For example, current relative positions of optical elements 94 may be compared with previous relative positions of optical elements 94 to determine if the rotational orientation of tool 92 has changed. Based on the determination of the rotational orientation of tool 92, the image generated by image generation device 16 on display 12 (e.g., FIG. 1) may be modified, or other aspects of system 10 may be modified in accordance with the determined rotational orientation of tool 92.

Figure 10:
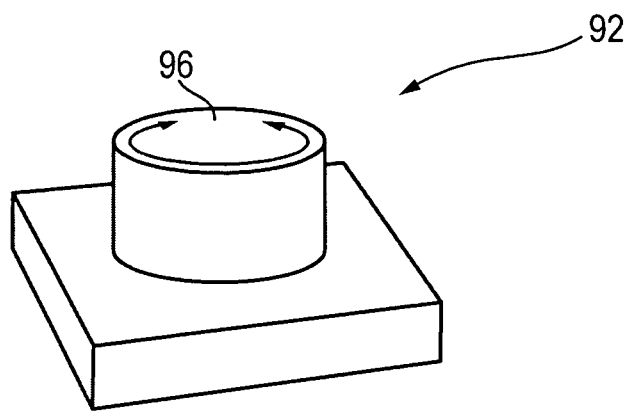
FIG. 10 illustrates a tool that emits electromagnetic radiation, according to one or more embodiments of the invention.

In other implementations, other mechanisms may be implemented to determine a rotational orientation of tool 92. For instance, an alternative implementation of tool 92 is illustrated in the shown in FIG. 10. In this implementation, tool 92 may include a knob 96 that is rotatable by a user with respect to a base portion 98 of tool 92. If the user rotates knob 96, one or more properties of the electromagnetic radiation emitted by tool 92 may be modified by tool 92. For example, the one or more properties may include a wavelength of the radiation, an intensity of the radiation, an amplitude modulation of the radiation, and/or a polarization of the radiation.

In response to the rotation of either tool 92 or knob 96 associated with tool 92 one or more of a variety of different effects may be displayed in the image generated by image generation device 16 (e.g., FIG. 1). For example, a size of one or more portions of the display that represent tool 92 may be changed, a number being displayed as part of the image may be changed, an object in the image may be moved around the image, and/or other manipulations of the image may be effected.

It should be appreciated that in some embodiments, one or more of optical elements 94 may include one or more emitters, and that tool 92 may include some or all of the functionality described above with respect to tool 64. This may include an ability to interface with a tool management apparatus (e.g., tool management apparatus 74) to enable tool 92 to be controlled in conjunction with one or more other tools being used simultaneously.

In instances in which tool 92 includes one or more emitters, tool 92 may include an emitter activation module that activates and deactivates the one or more emitters to conserve power. For instance, the emitter activation module may include a feather spring or loose magnet that acts as an actuator to cause the one or more emitters to emit a signal or set of signals when tool 92 is moved.

Figure 11:
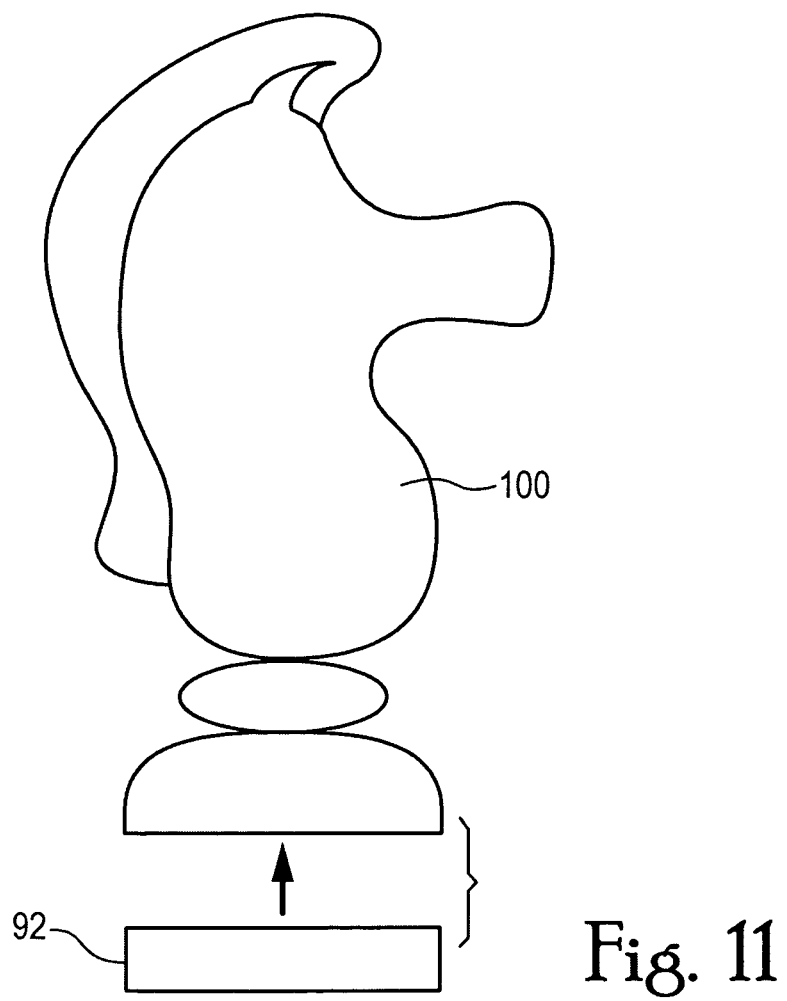
FIG. 11 illustrates a tool that emits electromagnetic radiation, according to one or more embodiments of the invention.

In some embodiments, tool 92 may comprise a stand alone piece that may be engaged by a user and positioned on display 12 (e.g., FIG. 1). In other embodiments, tool 92 may be provided to preexisting tools or pieces for supplementing the functionality of the preexisting tool or piece. For instance, FIG. 11 illustrates an implementation of tool 92 in which tool 92 may be added to a preexisting game piece 100. This may enable preexisting game piece 96 to be used as part of interactive display system 10 (e.g., FIG. 1).

Other examples of objects that may be implemented as tool 92 may include an object with a plurality of surfaces, and wherein one or more of the plurality of surfaces that provide electromagnetic radiation to waveguide 22 (e.g., via reflection, via emission, etc.) in a manner that is distinguishable from one or more of the others of the plurality of surfaces. For instance, this implementation of tool 92 may include a die that enables system 10 to determine the surface that is engaging display 12, the surface that is "up," and/or some other surface of the die.

In some embodiments of the invention, a tool configured to emanate electromagnetic radiation into display 12 of system 10 (e.g., FIG. 1) may be removably attachable to display 12 upon engagement with interface surface 20. For example, the tool may include a removable adhesive, a suction pad, an electrostatic attraction element, and/or other removably attachable elements that may enable the tool to be removably attached to display 20. In some implementations, display 12 may include a magnetic medium, such as a metal, and the tool may include a magnet. In these implementations, the magnetic material disposed within display 12 may include a woven grid of the magnetic material molded into a plastic plate, printed on waveguide 22, printed on a film that is attached to waveguide 22, an etched deposited layer, as a deposition process on a film or on waveguide 22 directly, and/or otherwise disposed in or near display 12. In some instances, the magnetic material may be provided at or near interface surface, as this may minimize a magnitude of the magnetic field required to removably secure the tool to display 12. In order to reduce various visual artifacts that may be introduced into system 10 by inclusion of a grid of magnetic material within display 12 (e.g., due to Moire interference), the patter of the grid may be stochastic.

In some implementations, tool 92 may include a device that receives input (e.g., from a user, from conditions around tool 92, etc.). In some instances, tool 92 may be configured to adjust the manner in which it emanates electromagnetic radiation into waveguide 22 based on the received input (e.g., by adjusting one or more of the properties of radiation emitted by an emitter associated with tool 92). For example, tool 92 may include a camera, a vibration sensitive device, a microdisplay, a mobile telephone, a computer mouse, a temperature sensitive device, a speaker device, a hygrometer, an altimeter, a microphone, and/or other tools.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An interactive display system comprising:
a waveguide that comprises:
an interface surface configured to be engaged by a user with an object; and
an underlayer having a first index of refraction and being disposed between layers of the waveguide having indices of refraction that are less than the first index of refraction; and
one or more photosensitive detectors in optical communication with the underlayer to receive electromagnetic radiation therefrom, the one or more photosensitive detectors generating one or more output signals, a given one of the one or more output signals being related to an amount of electromagnetic radiation received from the underlayer by the corresponding one of the one or more photosensitive detectors that generated the given output signal,
wherein the waveguide and the one or more photosensitive detectors are configured such that electromagnetic radiation emanating from the object into the waveguide is guided by total internal reflection within the underlayer to the one or more photosensitive detectors such that information related to the position of the object with respect to the interface surface can be determined as a function of the one or more output signals.

2. The system of claim 1, wherein the one or more photosensitive detectors comprise a plurality of photosensitive detectors.

3. The system of claim 2, further comprising a processor that determines information related to the position of the object with respect to the interface surface from the output signals based on the relative amounts electromagnetic radiation received by the photosensitive detectors.

4. The system of claim 3, wherein the underlayer is configured to diffuse the electromagnetic radiation propagating therethrough in a substantially uniform manner without regard for the directionality of the electromagnetic radiation.

5. The system of claim 3, further comprising an image generation device, wherein the processor controls the image generation device to generate an image that is viewable at the interface surface, and wherein the image generated by the image generation device is dictated at least in part by the information related to the position of the object with respect to the interface surface as determined by the processor.

6. The system of claim 5, wherein the processor controls the image generation device to generate the image to include markings and/or erasures at locations on the interface surface where the object has engaged the interface surface.

7. The system of claim 3, wherein the electromagnetic radiation emanating from the object that is guided by total internal reflection within the underlayer to the plurality of detectors comprises electromagnetic radiation emitted by the object, and wherein one or more properties of the electromagnetic radiation emitted by the object enable the processor to distinguish the object from one or more other objects.

8. The system of claim 1, further comprising a magnetic material disposed within or near the waveguide that enables the object to be removably attached to the interface surface if the object includes a magnetized material.

9. The system of claim 8, wherein the magnetic material is formed into a grid disposed within or near the waveguide.

10. The system of claim 1, further comprising a disposable layer removably disposed on the interface surface that protects the interface surface from one or more of scratches, stains, or impacts.

11. The system of claim 1, wherein the electromagnetic radiation that emanates from the object includes electromagnetic radiation that is reflected and/or scattered by the object.

12. The system of claim 1, wherein the underlayer is disposed within the waveguide apart from the interface surface.

13. The system of claim 1, further comprising:
an interface layer having a second index of refraction that provides the interface surface and is bounded on a side opposite from the interface surface by a waveguide layer having an index of refraction less than the second index of refraction; and
one or more emitters that are optically coupled to the interface layer to emit electromagnetic radiation that becomes trapped within the interface layer by total internal reflection, wherein if the object is engaged with the interface surface the object scatters and/or reflects electromagnetic radiation provided into the interface layer from the one or more emitters such that at least a portion of the scattered and/or reflected electromagnetic radiation is guided by total internal reflection within the underlayer to at least one of the one or more detectors.

14. The system of claim 1, further comprising:
an image generation device that provides electromagnetic radiation to the interface surface in spatially sequential manner; and
a processor,
wherein the electromagnetic radiation emanating from the object to be guided by total internal reflection within the underlayer to the plurality of detectors comprises electromagnetic radiation that is provided to the interface surface by the image generation device and is reflected and/or scattered by the object, and
wherein the processor determines the position of the object with respect to the interface surface from the output signals based on the timing of the receipt by the photosensitive detectors of electromagnetic radiation that has been provided to the interface surface by the image generation device in a spatially sequential manner and has been scattered and/or reflected by the object.

15. An interactive display system comprising:
a waveguide that provides an interface surface configured to be engaged by a user with an object;
one or more photosensitive detectors in optical communication with the waveguide to receive electromagnetic radiation therefrom, the one or more photosensitive detectors generating one or more output signals, a given one of the one or more output signals being related to one or more properties of the electromagnetic radiation received from the waveguide by the photosensitive detector that generated the given output signal; and a processor configured to receive the output signals generated by the plurality of photosensitive detectors, wherein the waveguide and the one or more photosensitive detectors are configured such that engagement of the interface surface with the object by the user causes electromagnetic radiation emanating from the object to be guided by total internal reflection within the waveguide to the one or more photosensitive detectors, and wherein the processor is further configured, based on the output signals generated in response to the electromagnetic radiation that is emanated by the object and received from the waveguide by the one or more photosensitive detectors, to (i) determine an identity of the object, and (ii) determine the position of the object with respect to the interface surface.

16. The system of claim 15, further comprising an image generation device that generates an image that is viewable at the interface surface, wherein the processor controls the image generation device such that the image generated by the image generation device reflects the identity of the object and the position of the object with respect to the interface surface.

17. The system of claim 16, wherein the output signals generated in response to the electromagnetic radiation that is emanated by the object and received from the waveguide by the plurality of photosensitive detectors enable the processor to determine the rotational orientation of the object.

18. The system of claim 17, wherein the processor controls the image generation device such that the image generated by the image generation device reflects the rotational orientation of the object.

19. The system of claim 17, wherein the object comprises one or more of a camera, a vibration sensitive device, a micro-display, a mobile telephone, a computer mouse, a temperature sensitive device, a speaker device, a hygrometer, an altimeter, or a microphone.

* * * * *